United States Patent
Fichter

(10) Patent No.: US 6,588,783 B2
(45) Date of Patent: Jul. 8, 2003

(54) APPARATUS FOR ASSISTING ENTRY INTO HIGH ROAD CLEARANCE VEHICLES

(76) Inventor: Thomas Fichter, 26860 I-45 North, Woodlands, TX (US) 77386

( * ) Notice: Subject to any disclaimer, the term of this patent is extended or adjusted under 35 U.S.C. 154(b) by 0 days.

(21) Appl. No.: 10/041,273

(22) Filed: Nov. 7, 2001

(65) Prior Publication Data

US 2003/0085545 A1 May 8, 2003

(51) Int. Cl.$^7$ .................................................. B60R 3/00
(52) U.S. Cl. ........................................ 280/169; 280/163
(58) Field of Search .............................. 280/163, 164.1, 280/166, 164.2, 169; 293/106, 117; D12/190, 203; 182/88, 90, 127; 296/62

(56) References Cited

U.S. PATENT DOCUMENTS

| | | | | |
|---|---|---|---|---|
| 1,043,715 A | * | 11/1912 | Mitchell | 280/163 |
| 2,559,123 A | * | 7/1951 | Jackson | 280/163 |
| 3,210,110 A | * | 10/1965 | Chieger | 293/106 |
| T977,005 I4 | * | 12/1978 | Sidles, Jr. et al. | 280/163 |
| 4,200,303 A | * | 4/1980 | Kelly | 280/166 |
| 4,610,458 A | * | 9/1986 | Garnham | 293/117 X |
| D293,667 S | * | 1/1988 | Weiler | D12/203 |
| 4,935,638 A | * | 6/1990 | Straka | 280/164.1 |
| 4,943,085 A | * | 7/1990 | Straka | 280/770 |
| 5,046,582 A | * | 9/1991 | Albrecht | 182/127 X |
| 5,137,293 A | * | 8/1992 | Graves et al. | 280/163 |
| 5,193,829 A | * | 3/1993 | Holloway et al. | 280/163 |
| 5,895,064 A | * | 4/1999 | Laubach | 280/163 |
| 6,017,045 A | * | 1/2000 | Dermody | 280/169 |
| D437,818 S | * | 2/2001 | Mothersele | D12/203 |
| D440,931 S | * | 4/2001 | Knight, III et al. | D12/203 |
| 6,422,342 B1 | * | 7/2002 | Armstrong et al. | 182/127 |
| 6,435,534 B1 | * | 8/2002 | Stone | 280/163 |

FOREIGN PATENT DOCUMENTS

WO          88/03882      *    6/1988

* cited by examiner

Primary Examiner—Brian L. Johnson
Assistant Examiner—Bryan Fischmann

(57) ABSTRACT

An apparatus for assisting entry into high road clearance vehicles having a generally cylindrical side bar adapted for attachment to a vehicle chassis, one or more U-shaped cylindrical bars attached to and suspended from said bar comprised of two end portions and a center bar, a generally flat surface on the top of each of said center bar of said U-shaped bars. The U-shaped bars maybe of tubular construction and have a flat surface and are preferably angled from the side bar at an angle of approximately 45 degrees and each U-shaped bar has end portions that meet the center bar at an angle of approximately 0 to 45 degrees. The side bar may be attached to any of a variety of chassis designs and may have a plurality of steps at the doors and at or near the back of the vehicle.

1 Claim, 4 Drawing Sheets

APPARATUS FOR ASSISTING ENTRY INTO HIGH ROAD CLEARANCE VEHICLES

STATEMENT REGARDING FEDERALLY SPONSORED RESEARCH OR DEVELOPMENT

Not applicable

CROSS REFERENCE TO RELATED APPLICATIONS

Not applicable

BACKGROUND OF THE INVENTION

This invention relates generally to the field of vehicle accessories, and more particularly to automotive side bars for assisting entry into high road clearance vehicles.

The present invention relates in general to vehicle side bars for sport utility vehicles, pick-up trucks, jeeps and similar vehicles.

A vehicle side bar is an accessory which has gained considerable popularity in recent years. In essence, it is a wide tubular bar which is attached to the side of a vehicle just below the passenger cab. It usually covers the length of the cab and projects laterally to the outside of the cab side or door surface. It is usually bolted or welded to the main longitudinal frame beam of the vehicle chassis.

The side bar is both an appearance accessory and provides some protection for door and side of the vehicle cab to deflect debris.

Many vehicles of earlier date had running boards along the side of the vehicle to provide a stable platform to stand on and assist in entry and exit from the vehicle. More recently, side bars have been manufactured and sold, primarily by small and large automotive accessory companies. Side bars, while primarily a styling accessory, have been modified to provide a step built into the side bar to assist in entry of and exit from the vehicle. The side bar system of the present invention, in contrast with side bars with a step built into the bar, provides a step assembly independent of the side bar providing a stable step closer to the ground.

Running boards were at one time a standard feature on most passenger vehicles, including light duty trucks such as pickup trucks. The running board provided an intermediate step that was an aid in entering the passenger compartment of the vehicle.

As vehicle designs changed, the bodies of the vehicles were lowered and the running board disappeared from the design of the vehicle. The body of the vehicles, in addition to being lowered was widened to provide more space in the passenger compartment. This design concept of eliminating running boards carried over to other vehicles that were not lowered in design, such as four wheel drive pickups and sport utility vehicles.

Four wheel drive vehicles are intentionally designed with a relatively high road clearance, that is the frame and body is supported at a relatively high distance from the ground. This is a desired characteristic, since the user of the vehicles wants the maximum clearance for traversing adverse road conditions such as deep snow, muddy and rutted roads and the like. Additionally four wheel drive vehicles are often driven off improved roadways where all types of conditions are likely to be encountered.

One of the problems with a high clearance vehicle is the height of the entry into the passenger compartment. The floor of the passenger cab is of necessity high above the ground and for many individuals, the required "step" is too high to permit easy entry.

Side bars such as those similar to and described in U.S. Pat. No. 4,935,638 provide a step on the side bar itself. This step is many times still too high off the ground to permit easy entry into the vehicle. Aesthetically, a step built into the side bar also visually disrupts the clean line and streamlined appearance of the bar.

BRIEF SUMMARY OF THE INVENTION

The primary object of the invention is assists entry into vehicle passenger compartment. Another object of the invention is to provide an intermediate step between the ground and the floor of the passenger compartment.

Another object of the invention is to provide a stylish appearance accessory to vehicle.

A further object of the invention is to provide a functional side step and/or a protective device for the door and side of the vehicle cab.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an apparatus for assisting entry into high road clearance vehicles having a generally cylindrical side bar adapted for attachment to a vehicle chassis, one or more smaller U-shaped cylindrical bars attached to and suspended from said bar comprised of two end portions and a center bar, and a generally flat surface on the top of each of said center bar of said U-shaped bars.

In accordance with another preferred embodiment of the invention, there is disclosed an apparatus for assisting entry into high road clearance vehicles having a generally cylindrical side bar adapted for attachment to a vehicle chassis, one or more U-shaped cylindrical bars attached to and suspended from said bar comprised of two end portions and a center bar; and a non-skid surface on the top of each of said center bars of said U-shaped bars.

The tubular side bar is mounted onto the vehicle chassis by means of mounting brackets which attach to the chassis and the side bar by a variety of conventional means including but not limited to welds, brazing or attachment with nuts and bolts.

The smaller U-shaped tubular bars are attached to the side bar by welds, brazing or other means. Similarly, a step is constructed by attaching a flat bar to the top of the U-shaped tubing. This configuration is the step assembly. An additional lower step can be constructed by using another small U-shaped tubular bar and attaching it to the first step assembly. In this manner additional steps can be produced for higher clearance vehicles.

The side bar and attached step assembly mounted by brackets to the vehicle chassis form a streamlined accessory just below the bottom of the vehicle passenger cab and extending from just aft of the forward wheel fender to just forward of the rear wheel fender. The step assembly (or assemblies) is (are) suspended from the side bar and positioned just below each door or passenger exit to assist entry and exit from the vehicle.

The composition of the tubular bars and flat bar can be metal or any of a number of high strength composite materials. The finish of the bars can be but is not limited to chrome, polished metal or high or low gloss paint to complement the appearance of the vehicle.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE SEVERAL DRAWINGS

FIGS. 3A through E are top and side plan views of the side bar, step assembly components and mounting brackets.

Figure 4:
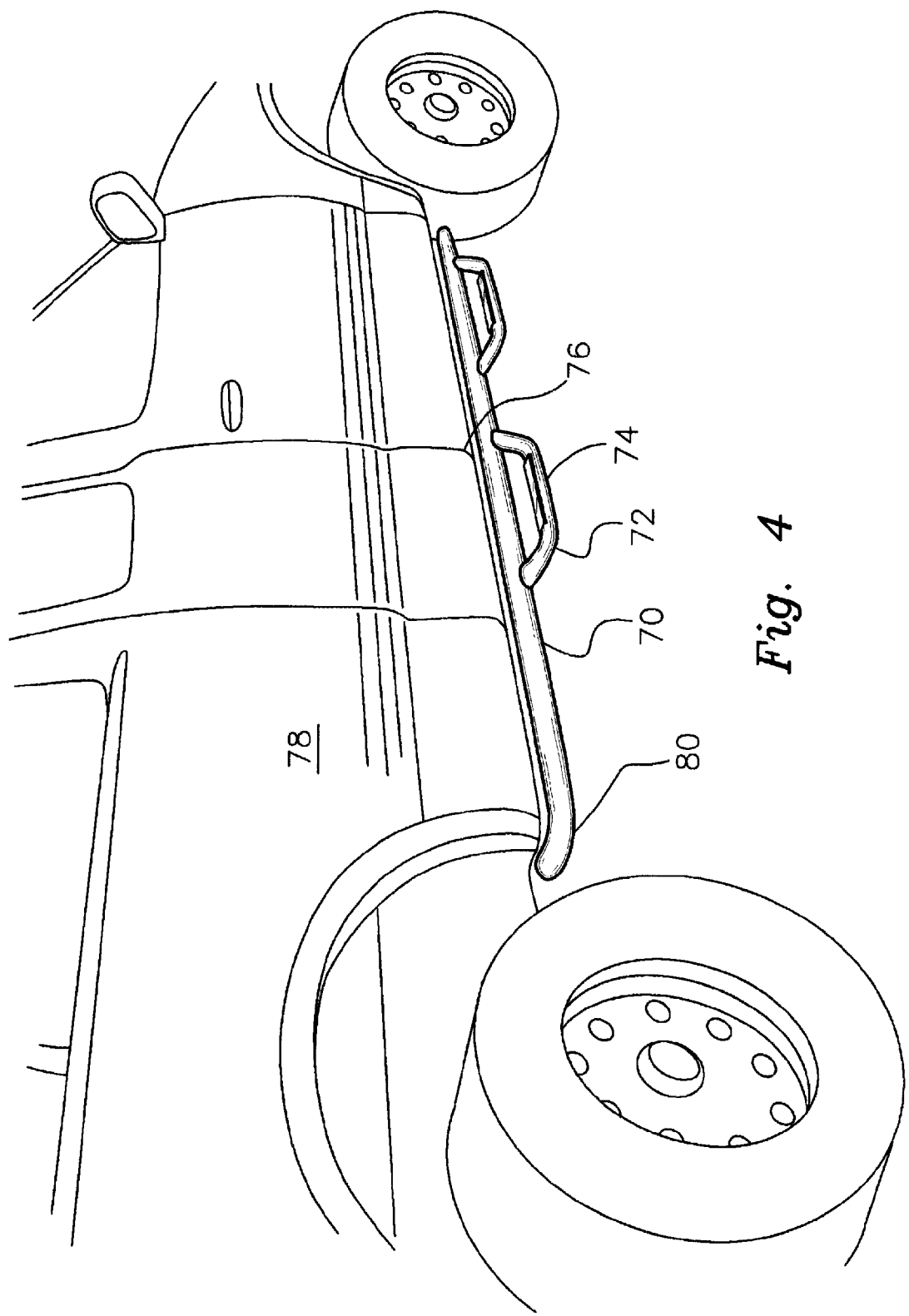

FIG. 4 is a side perspective view of the invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
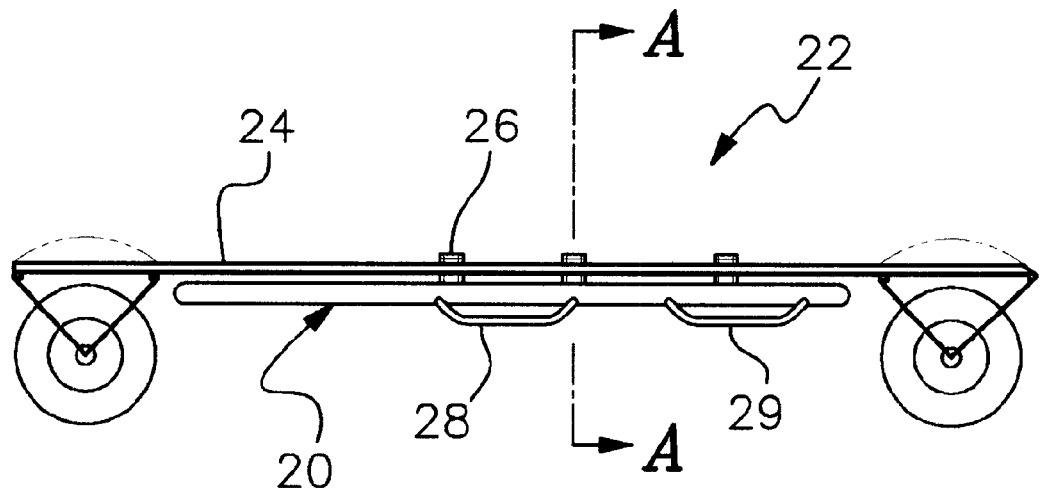
FIGS. 1A and 1B are top and side plan views of the invention.

Turning now to the drawings, FIG. 1A illustrates side bar 20 attached to the underside of vehicle 22, partially shown in phantom. Vehicle 22 may be one of any number of sport utility vehicles, pick up trucks or other vehicles. Side bar 20 is typically welded or brazed to mounting brackets 26 which are then attached to vehicle underside chassis 24 of vehicle 22 by use of bolts, welds, brazing or other means well known in the art. The side bar typically extends the majority of the distance underneath a passenger compartment and may extend along the direction between the front and rear wheels of the vehicle. Side bar 20 may be formed from a generally cylindrical tube having a cross section of any a variety of polygonal shapes including, but not limited to, a circle, a square, a rectangle, a triangle, an oval, an ellipse, or any other suitable shape. Side bar 20 may also be any other rigid member that is capable of mounting on a chassis along the underside of the vehicle. Side bar 20 functions as a protective guard for the exterior side surfaces of vehicle 22 and serves as a stable platform for attachment of the smaller U-shaped bar of step assembly 28. Step assembly 28 may also be made using tubular construction. The invention teaches that a flat bar 29 may be attached on the upper surface of the center of the bar of step assembly 28 to thereby form a step. Alternatively a non-skid surface may be applied to that area of the bar to form a step surface on flat bar 29.

In a preferred embodiment of the invention the tubular bar of the step assembly 28 is attached to the side bar 20 by welding; the welds are ground and sanded to a smooth finish prior to polishing and/or painting of the metal surfaces of the invention. Typical side bars 20 and U-shaped tubular bars of the step assembly 28 comprise rugged tubular steel tubing although other materials including but not limited to high tensile strength composites may be used. Similarly, flat bars 29 that form a step are typically stamped steel although other materials may be used. In an alternative embodiment non-skid materials of various kinds can be applied to the top of the center of the tubular bar of the step assembly 28 to form a step.

On a four-door vehicle, side bar 20 is fitted with tubular bars for step assembly 28 and flat bar 29 positioned below and generally centered below each door. Step assembly 28 is preferably located relative to the doors so that a passenger can easily use the step to enter and exit vehicle 22. Alternatively, vehicle 22 may have two side doors, a third opening for a mini-club cab or a specialty vehicle with a plurality of doors for the passenger cab; in each case a step assembly and step is positioned below each door. In addition, a step assembly 28 may be located behind the rear door just before the rear tire well to permit step access to the bed of the truck or the rear roof surface of a sport utility vehicle.

Figure 1B:
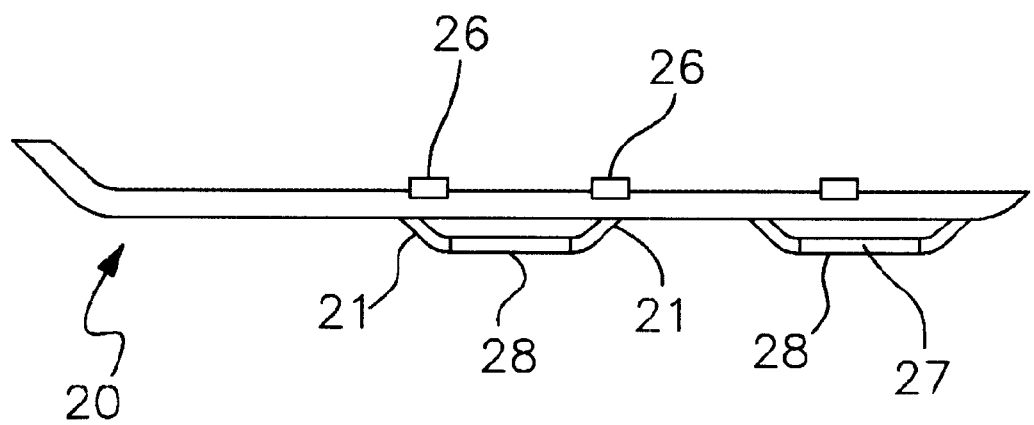

FIG. 1B shows a preferred embodiment of the invention from a side view before being mounted on a vehicle. Step assembly 28 is a U-shaped bar having two ends 21 connected together by a central bar 27 that together attach to side bar 20 to form a step. The angle at which ends 21 attach to central bar 27 may be of any of a variety of angles typically from 0 to 45 degrees to facilitate easy access by a human foot and a stopping point on either side of central bar 27 to inhibit slipping and undesired movement of the person using the step. Ends 21 may be of two different angles on one step assembly depending on the application. Attached to or formed in central bar 27 is flat surface (flat bar 29 of FIG. 1A) to form a convenient location for a foot to alight.

Figure 2:
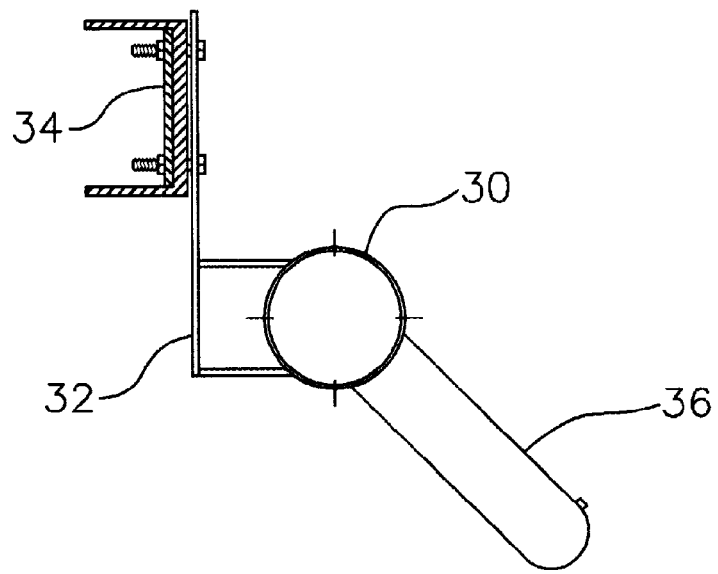
FIG. 2 is a longitudinal cross sectional view of the invention taken along line A—A of FIG. 1.

FIG. 2 illustrates a side cross sectional view of the invention along the line A—A of FIG. 1. In the preferred embodiment, side bar 30 is welded to mounting bracket 32. Mounting bracket 32 is bolted to the vehicle underside chassis 34 to stably secure the side bar below the vehicle body (not shown). Step assembly 36 (consisting of the tubular bar and step previously described) is welded to side bar 30 at an appropriate angle to provide an optimum setback from the vehicle passenger cab and easy to access surface to assist in entering and exiting the vehicle. Preferably, the angle should be approximately 45 degrees from the horizontal plane. There may be applications where the angle could be anywhere from 0 to 90 degrees relative to the horizontal plane depending on vehicle height off the ground and the particular use intended.

Figure 3A:
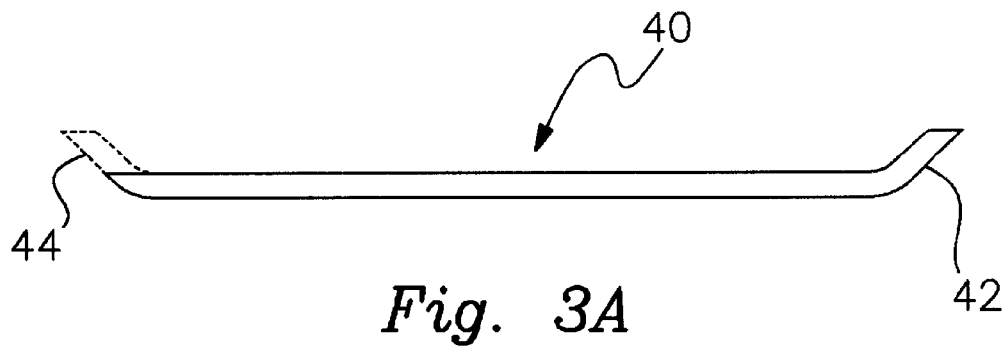

FIGS. 3A through F show each of the component parts of a preferred embodiment in more detail. FIG. 3A shows a top plan view of side bar 40. During manufacture side bars 40 are cut to lengths customized for each vehicle. After cutting side bar 40 to the desired length, the ends are bent and stylized bent ends 42 and 44 created. One or both of the bent ends may be removed as depicted on the left bent end 44 in shaded outline in the figure to achieve the desired stylized effect. In the preferred embodiment the tubular bar is comprised of mild steel of 3 inch diameter and 14 gauge thickness although other generally cylindrical shapes and materials can be used for side bar 40.

Figure 3B:
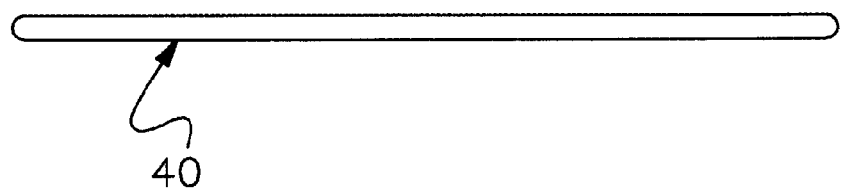

FIG. 3B shows a side plan view of side bar 40 and accurately depicts a clean closed appearance of the side bar with the bent ends removed as in outlined bent end 44 from FIG. 3A.

Figure 3C:
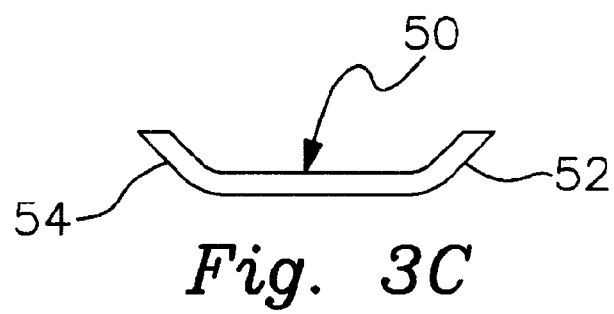

FIG. 3C shows a top plan view of step assembly tubular bar 50. During manufacture step assembly tubular bars 50 are cut to lengths customized for each vehicle. The angle at which the bend is applied to bar 50 may be of any of a variety, typically between approximately 0 to 45 degrees to permit easy access of a foot when stepping onto the step assembly. After cutting tubular bar 50 to the desired length the ends are bent and stylized bent ends 52 and 54 created. Bent ends 52 and 54 are then smoothed and recut to provide a surface that can be attached flush to side bar 30. In the preferred embodiment tubular bar 50 is comprised of mild steel of 1.5 inch diameter and 14 gauge thickness although other generally cylindrical shapes and materials can be used for tubular bar 50.

Figure 3D:
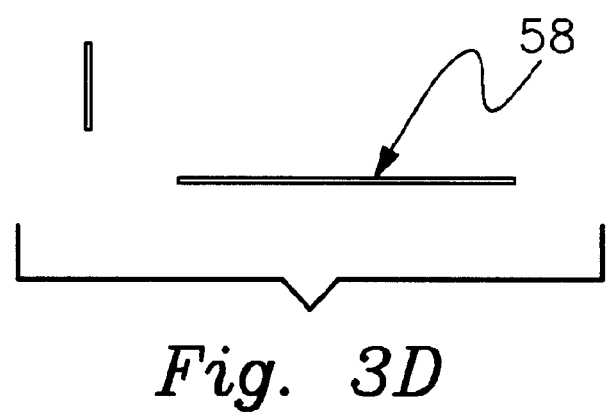

FIG. 3D shows side plan view of flat bar 58 that is used to create a stepping surface in the step assembly. In the preferred embodiment the flat bar is welded to the top portion of the tubular bar shown in FIG. 3C in a manner that creates a step that is horizontal to the ground when the vehicle is parked on a level surface. The flat bar typically consists of stamped steel although other materials well known in the art may be substituted.

Figure 3E:
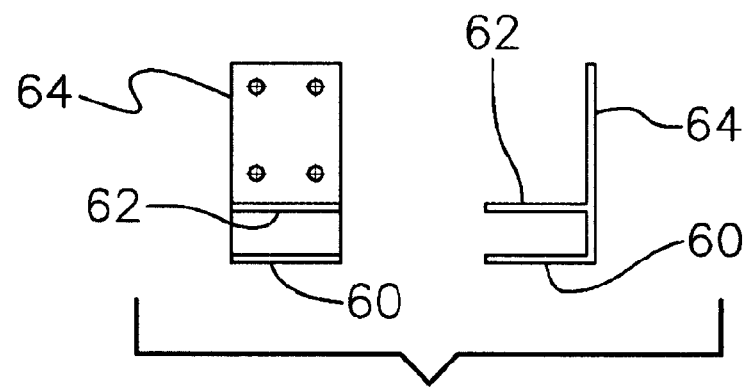

FIG. 3E shows two side plan views of a preferred embodiment of the mounting bracket. The mounting bracket typically consists of stamped steel and is fashioned to each vehicle model to stably hold the side bar in the preferred position below the vehicle body. A typical mounting bracket consists of arms 60 and 62 of varying lengths that hold the side bar in place. With a preferred 3 inch diameter side bar the distance between the top and bottom arms 60 and 62 would be 2.25 inches allowing a secure attachment by means of welding or brazing of the side bar to the arms 60 and 62. Extension 64 is attached to arms 60 and 62 and is adapted for mounting on the chassis of the vehicle by bolts (not shown) placed in pre-drilled holes on extension 64.

FIG. 4 is side view of the preferred embodiment of the invention in a typical installation mounted on high road clearance vehicle 78. As previously described, side bar 70 and tubular bar of step assembly 72 form an aesthetically pleasing streamlined appearance along the underside of the vehicle body. Bent arm 80 of the side bar complements the bent arms of the step assembly tubular bars and forms a symmetrical visual that is pleasing to the eye and creates a safe edge on the bar that is less likely to be caught on objects or people. Mounting brackets 76 are somewhat hidden in a properly installed installation and do not interfere with ingress or egress from the vehicle. Likewise flat bar 74 for the step assembly forms a step without taking away from the safe application as a step formed by the invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention; and therefore, such adaptations should and are intended to be comprehended within the meaning and range of equivalents of the following claims. Although this invention has been described in terms of certain preferred embodiments, other embodiments that are apparent to those of ordinary skill in the art are also within the scope of this invention, as defined in the claims which follow.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for assisting entry into high road clearance vehicles comprising:

a generally cylindrical side bar adapted for horizontal attachment to a vehicle wherein said bar is positioned along the longitudinal axis of the vehicle;

at least one smaller U-shaped generally cylindrical bar comprised of two end portions and a center portion, said and portions welded to and suspended from said side bar; and a generally flat surface on the top of said center portion to thereby provide a step.

\* \* \* \* \*

UNITED STATES PATENT AND TRADEMARK OFFICE
CERTIFICATE OF CORRECTION

PATENT NO. : 6,588,783 B2  
DATED : July 28, 2004  
INVENTOR(S) : Thomas Fichter It is certified that error appears in the above-identified patent and that said Letters Patent is hereby corrected as shown below:

Column 6,
Line 34, (first occurrence) "and" should read -- end --.

Signed and Sealed this

Seventh Day of September, 2004

JON W. DUDAS
*Director of the United States Patent and Trademark Office*